United States Patent
Potente

Patent Number: 5,941,194
Date of Patent: Aug. 24, 1999

[54] CAVITY NEST ENTRANCE SHIELD

[76] Inventor: John E Potente, 659 Wheeler Rd., Hauppauge, N.Y. 11788

[21] Appl. No.: 09/056,167

[22] Filed: Apr. 7, 1998

[51] Int. Cl.$^6$ .................................................. A01K 31/00
[52] U.S. Cl. ............................................................. 119/428
[58] Field of Search ...................... 119/329, 339, 119/428, 431, 432, 433, 434, 435, 430

[56] References Cited

U.S. PATENT DOCUMENTS

| | | | |
|---|---|---|---|
| 1,130,095 | 3/1915 | McIntyre | 119/329 |
| 1,185,345 | 5/1916 | Reiber | 119/433 |
| 1,209,979 | 12/1916 | Larson | 119/432 |
| 1,994,208 | 3/1935 | Brown | 119/329 |
| 3,244,148 | 4/1966 | Long | 119/430 |
| 4,506,629 | 3/1985 | Cross | 119/428 |
| 4,889,075 | 12/1989 | Byrns | 119/435 |
| 5,228,410 | 7/1993 | Parker | 119/428 |

*Primary Examiner*—Michael J. Carone
*Assistant Examiner*—James S. Bergin
*Attorney, Agent, or Firm*—Alfred M. Walker

[57] ABSTRACT

The invention comprises a structure that affixes over the entrance hole of an avian cavity nest and serves to discriminate between prospective nesting birds by virtue of having the entry diverted to a vertical entranceway with the access on the lower end. The prospective bird must pass up through the structure to gain access to the entrance hole of the nest cavity.

10 Claims, 2 Drawing Sheets

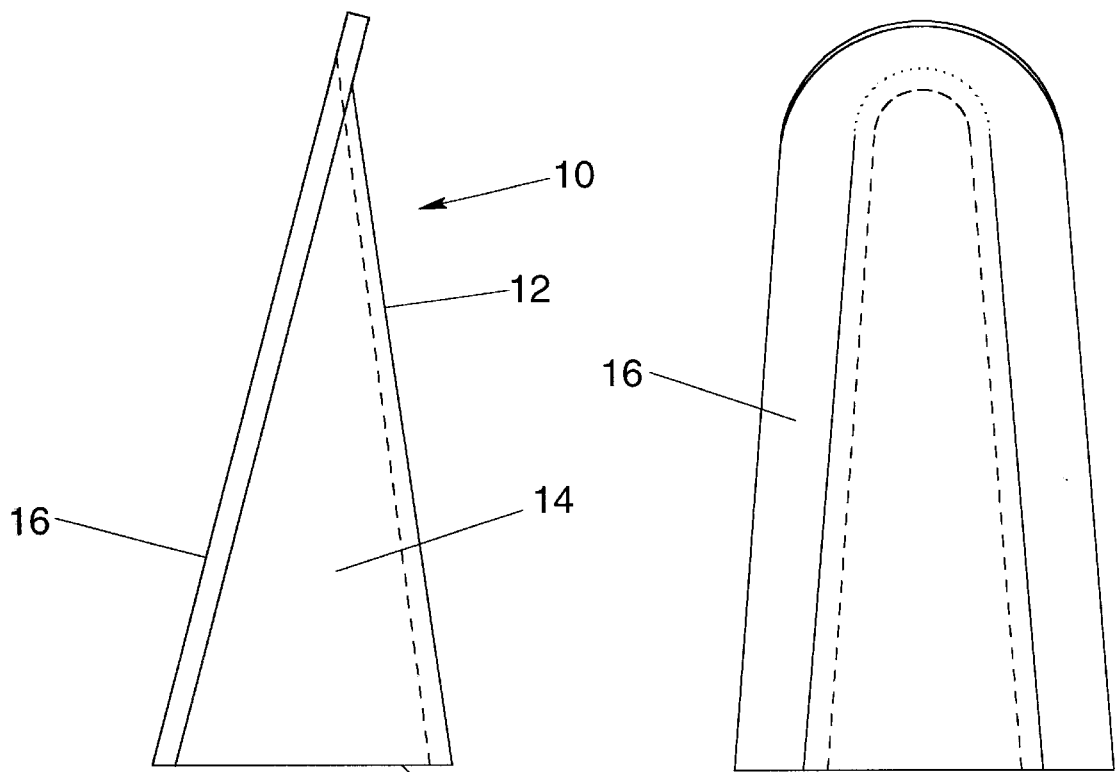
Figure 1
Figure 2
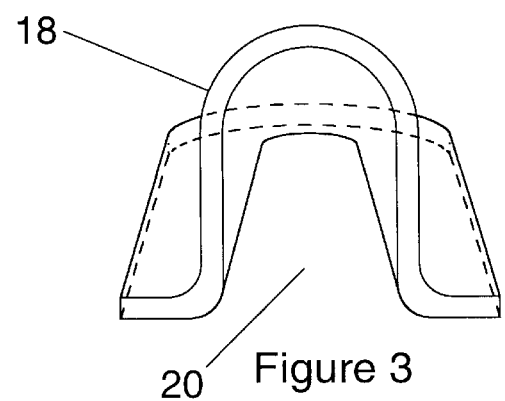
Figure 3

CAVITY NEST ENTRANCE SHIELD

BACKGROUND OF THE INVENTION

1. Field of the Invention

With the loss of suitable habitat for cavity nesting birds there has developed a competition for remaining tree cavities and artificially provided nest boxes. This invention relates to a device which prevents prolific birds (such as the European Starling) from procuring nest sites from rarer avian species. The apparatus constitutes a shield that is placed over the entrance hole that allows access to only those birds capable of scaling a vertical surface (such as woodpeckers).

2. Description of the Prior Art

While attention has been devoted to restricting the access to avian cavity nests at the entrance site the selective factor has focused on the size of the entrance hole.

The prior disclosure of Larson (U.S. Pat. No. 1,209,979) demonstrates a truncated cone structure with the smaller end serving as the entrance opening. The only discriminating factor in this presentation is the diameter of the entrance hole specifically governing passage of bird species of different sizes. It does not distinguish between birds that may be the same size.

Bescherer (U.S. Pat. No. 4,318,364) presents curved shaped channels that approximate the size of the bird. However, these protective channels are designed and utilized to merely act as access ports to a feeder in which the bird obtains seeds that lie at its lower end. The function of structure 28 of Bescherer is to serve as a buffer to prevent seed from spilling out of a bird feeder while providing birds with a location with which to acquire the seed. It does not function as a restrictive device and allows birds of varying sizes access to the seed so long as their beaks may negotiate the porthole. The configuration of the port channel is arranged for easy access from above such that any bird may gain access by simply lowering its head. The need exists for a configuration whereby the bird is challenged to enter an access opening from below to gain access to a nesting cavity.

The prior patent disclosure of Parker (U.S. Pat. No. 5,228,410) calls for a "safe entry for bird houses". Again, this patent concerns itself with entry restrictions simply in terms of the size of the bird. It selects for smaller birds. And it allows for entry of any bird that can fly to and grasp a protruding perch-like structure. But what happens when you are trying to discriminate between two birds that are the same size?

BRIEF SUMMARY OF THE INVENTION

It is an object of this invention to provide a structure that covers an entrance hole to an avian nesting cavity and serves to exclude unwanted bird species from gaining entrance to the nest. It is a further object of this invention to permit entry to the nest of only those birds capable of scaling a vertical surface with their feet.

BRIEF DESCRIPTION OF THE DRAWINGS

In conjunction with the detailed description, reference is made to the drawings wherein:

FIG. 1 is a side view of the device
FIG. 2 is a Frontal view of the device
FIG. 3 is a Lower view looking up into the device

DETAILED DESCRIPTION OF THE INVENTION

Figure 4:
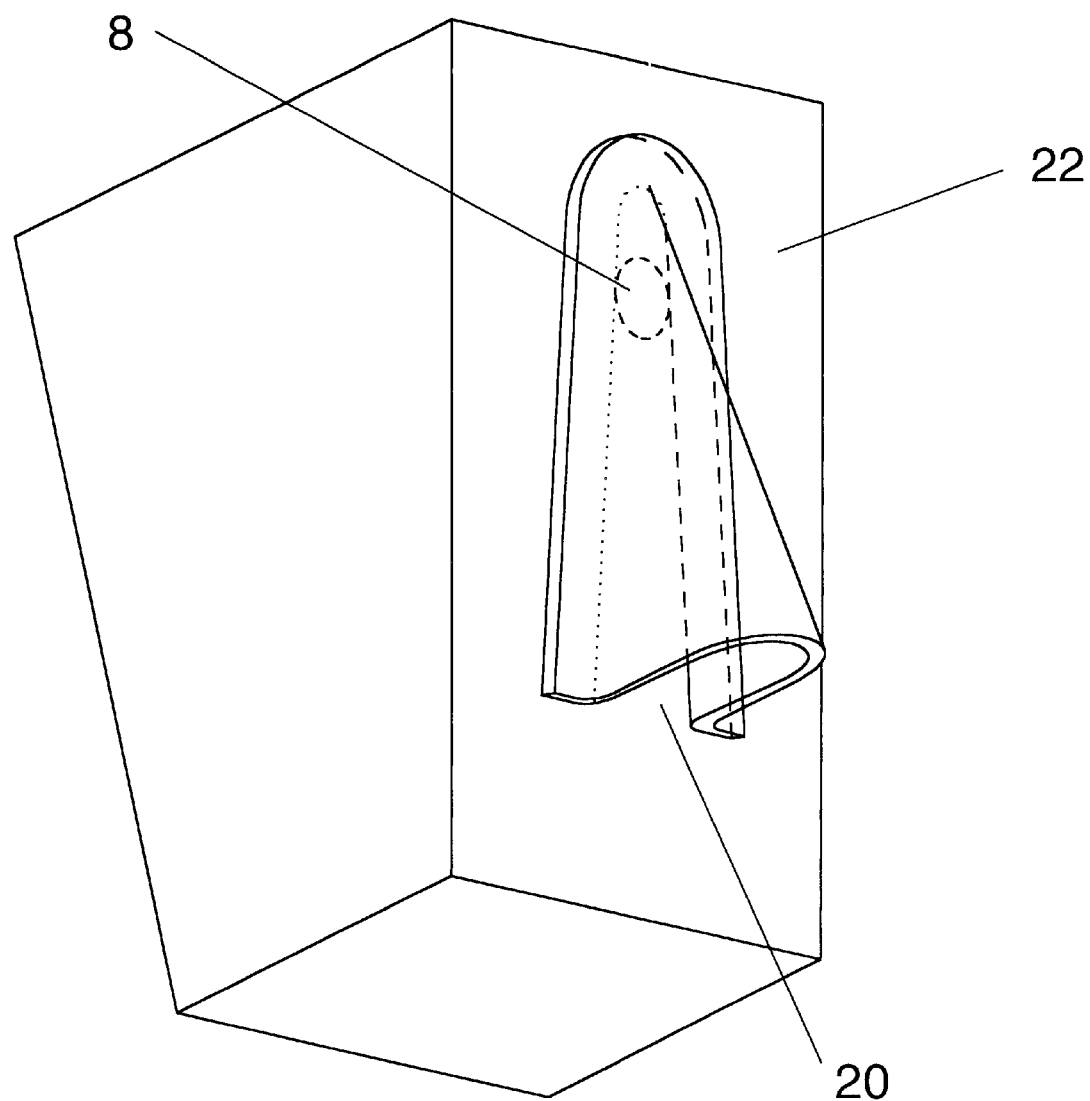
FIG. 4 is a perspective view of the device, as it would affix over the entrance hole of a nesting cavity.

The device 10 as depicted in FIG. 1 comprises a face 12 and sides 14, which act to enclose a hollow space that may open at the lower end 18. The structure is bordered by a peripheral flange 16 as depicted in FIG. 2, which acts as a seal and means of attachment to the nesting cavity. As shown in FIG. 4, face 12 is cantilevered and spaced apart from nesting cavity 22.

The face 12 of the structure is cylindrically curved and open at its lower end 18 as shown in FIG. 3. This opening 20 serves as the entrance into the device itself.

FIG. 4 depicts the structure, as it would appear in juxtaposition to the entrance hole 8 of a nesting cavity 22. Birds are thus prohibited from flying directly to the entrance hole 8 and must negotiate up through the lower opening 20 and then through the device. This would then select for only those birds with the ability to climb up a vertical surface.

The device is to be of sufficient clarity so that the entrance hole is visible to the birds in search of a nesting site.

The device 10 is of a smooth material to facilitate cleaning and durable to withstand exterior weather.

I claim:

1. An accessory entrance shield device for a bird nesting cavity structure which allows entry through an entry hole only to those birds able to negotiate and climb up an exterior surface of said bird nesting cavity structure, by climbing up said exterior surface with their respective feet, while denying access to other non-climbing birds, comprising:

a hollow entrance shield attached to said bird nesting cavity structure;

said hollow entrance shield having a face extending cantilevered and spaced apart from said entry hole of said bird nesting cavity structure;

said face being separated from said entry hole by a pair of side members attached at respective distal ends thereof to said face and at proximal ends thereof to said bird nesting cavity structure;

said hollow entrance shield having a bottom opening permitting access therethrough only to the birds which are able to negotiate and climb up said exterior surface of said bird nesting cavity structure; and, said hollow entrance shield denying direct flying access to said entry hole of said bird nesting cavity structure.

2. The accessory entrance shield device as in claim 1 further comprising a peripheral flange attached to said proximal ends of said side members of said hollow entrance shield.

3. The accessory entrance shield device as in claim 2 wherein said peripheral flange is attached to said exterior surface of said bird nesting cavity structure.

4. The accessory entrance shield device as in claim 1 wherein said side members and said face form together a curved surface.

5. The accessory entrance shield device as in claim 1 wherein said entry hole of said bird nesting cavity structure is visible through said hollow entrance shield.

6. A combination bird nesting cavity structure and entrance shield for allowing entry through an entry hole of the bird nesting cavity structure only to those birds able to negotiate and climb up an exterior surface of said bird nesting cavity structure by using their respective feet, while denying access to other birds, comprising:

a hollow bird nesting cavity structure having an entry hole therein;

a hollow entrance shield attached to an exterior surface of said bird nesting cavity structure;

said hollow entrance shield having a face extending cantilevered and spaced apart from said entry hole;

said face being separated from said entry hole by a pair of side members attached at respective distal ends with said face and at proximal ends thereof to said bird nesting cavity structure;

said hollow entrance shield having a bottom opening permitting access therethrough only to the birds which are able to negotiate up said exterior surface of said bird nesting cavity structure; and, said hollow entrance shield denying direct flying access to said entry hole of said bird nesting cavity structure.

7. The combination bird nesting cavity structure and entrance shield as in claim 6 further comprising a peripheral flange attached to said proximal ends of said side members of said hollow entrance shield.

8. The combination bird nesting cavity structure and entrance shield as in claim 7 wherein said peripheral flange is attached to said exterior surface of said bird nesting cavity structure.

9. The combination bird nesting cavity structure and entrance shield as in claim 6 wherein said side members and said face form together a curved surface.

10. The accessory entrance shield device as in claim 6 wherein said entry hole of said bird nesting cavity structure is visible through said hollow entrance shield.

* * * * *